C. A. RICHARDS.
LOCKING DEVICE FOR CARCASS HANGERS.
APPLICATION FILED AUG. 5, 1912.

1,072,871.

Patented Sept. 9, 1913.

Witnesses.
Harry S. Gaither.
Ephraim Banning.

Inventor
Charles A. Richards.
by Banning & Banning
Attys.

COLUMBIA PLANOGRAPH CO., WASHINGTON, D. C.

UNITED STATES PATENT OFFICE.

CHARLES A. RICHARDS, OF BELLOWS FALLS, VERMONT.

LOCKING DEVICE FOR CARCASS-HANGERS.

1,072,871.   Specification of Letters Patent.   Patented Sept. 9, 1913.

Application filed August 5, 1912.   Serial No. 713,361.

*To all whom it may concern:*

Be it known that I, CHARLES A. RICHARDS, a citizen of the United States, residing at Bellows Falls, in the county of Windham and State of Vermont, have invented certain new and useful Improvements in Locking Devices for Carcass-Hangers, of which the following is a specification.

This invention relates to a device adapted to be used in connection with animal carcass hangers to hold the same properly in position while the carcass is being split.

By the device herein described, it is sought to provide a simple, inexpensive form of lock adapted to be used in connection with movable carcass hangers of any type whatever; one which is readily adjustable to any standard overhead rail upon which carcass hangers may be suspended, and which may be readily attached and detached; and a locking device which operates effectively to hold the hangers apart at any point upon the rail without any special construction or utilization of special accessories in connection therewith.

The invention further consists in the features of construction and combination of parts hereinafter described and claimed.

Figure 1:
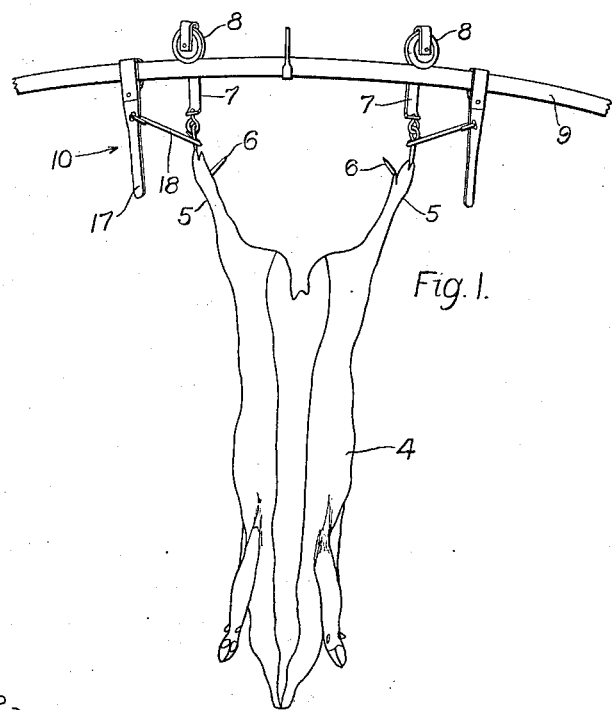
Figure 2:
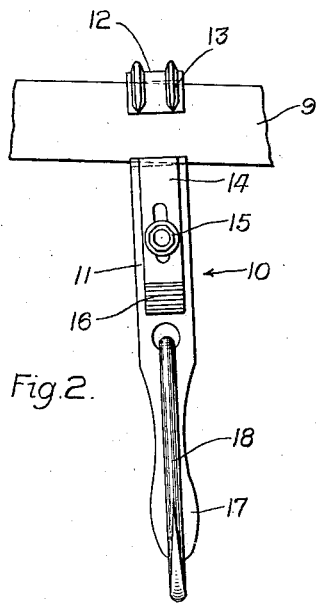
Figure 3:
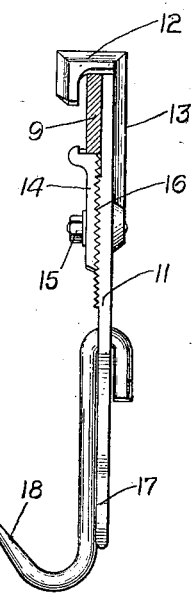

In the drawing, Figure 1 is a perspective view of an animal carcass suspended upon movable hangers and in position to be split; Fig. 2 is an enlarged front elevation of the device in locking position upon the rail; and Fig. 3 is a side elevation of the device in the same position.

Animal carcasses are usually suspended upon movable hangers which are adapted to travel upon an overhead rail, so as to be conveniently moved from place to place. When it is desired to split the carcass, the hangers to which the legs of the animal are usually secured must be spaced apart in order to facilitate this operation. Various means have been devised for locking the hangers in such positions, usually involving expensive and cumbersome apparatus located fixedly at some point adjacent the overhead rail. It is the provision of a simple adjustable locking device readily attachable and detachable at any point upon the ordinary type of rail, that the present invention is designed.

As shown in Fig. 1, an animal carcass 4 is suspended from its legs 5 by means of hooks 6 carried by movable hangers 7 suitably mounted on rollers or trucks 8 grooved to travel along an overhead rail 9. The carcass so suspended may be readily moved along the rail from one room to another by means of the truck and hanger shown. The operation of splitting the carcass may be performed at any place it may happen to be suspended by attaching over the rail the locking device 10 which constitutes the subject matter of the present invention.

This device consists of an arm 11 formed with a bent-over clamping end 12 adapted to overlie and embrace the upper edge of the rail 9, the said clamping end being reinforced as by means of ribs 13; and an adjustable jaw 14 secured thereto as by means of a bolt 15, the adjustment of the jaw with respect to the clamping end being facilitated by means of the teeth 16 formed therebetween. The lower end of the device is formed to provide a handle 17, whereby it may be easily attached and moved upon, and detached from, the rail, and has connected therewith a swingingly mounted carcass hook 18 adapted to engage with the truck hangers. The adjustment of the jaw with respect to the clamping member is ordinarily such that a sufficient gap or opening will be provided for attaching the device readily upon the rail, but not so much as to permit of any great side or lateral play thereupon.

As best shown in Fig. 2, the device is adapted to impinge the edges of the engaging surface of the clamping member and jaw secured thereto upon the rail, and to bite thereupon when pressure at the handle end is exerted laterally, as by the weight of the carcass in the position shown in Fig. 1. When attached upon a rail with its hook secured to the truck hangers, as shown in the drawing, the weight of the carcass tends to bring the hangers together with the result that the locking device engages with the rail tightly to prevent inward movement of the hangers. After the operation of splitting has been completed the two halves of the carcass remain each suspended upon one of the truck hangers, and may be moved along the rail without interference when the locking device is simply detached therefrom.

It is obvious that, with the hook formed as shown in Figs. 2 and 3, the device may also be used as a stationary hanger for an animal carcass.

I claim:

1. In combination with a single continuous supporting rail and hanger movable thereupon, a device of the class described comprising an arm having one end thereof bent in the form of a hook to engage the upper side of said rail, a jaw positioned upon said arm adapted to engage the under side of said rail, an edge each of said hook end and jaw being adapted to impinge upon the rail at any point thereupon when the device is tilted in either direction longitudinally of the rail whereby it becomes locked thereupon, and means connecting the free end of said arm with the said movable hanger adapted upon tension to tilt the device, substantially as described.

2. In combination with a single continuous supporting rail and hanger movable thereupon, a device of the class described comprising an arm having one end thereof bent in the form of a hook to engage the upper side of said rail, a jaw adjustably positioned upon said arm adapted to engage the under side of said rail, an edge each of said hook end and jaw being adapted to impinge upon the rail at any point thereupon when the device is tilted in either direction longitudinally of the rail whereby it becomes locked thereupon, and means connecting the free end of said arm with the said movable hanger adapted upon tension to tilt the device substantially as described.

3. In combination with a single continuous supporting rail and hanger movable thereupon, a device of the class described comprising an arm having one end thereof bent in the form of a hook to engage the upper side of said rail, a jaw positioned upon said arm adapted to engage the under side of said rail, an edge each of said hook end and jaw being adapted to impinge upon the rail when the device is tilted in either direction longitudinally of the rail whereby it becomes locked thereupon, and means connecting the free end of said arm with the said movable hanger adapted upon tension to tilt the device, substantially as described.

4. In combination with a single continuous supporting rail and hanger movable thereupon, a device of the class described comprising an arm having one end thereof bent in the form of a hook to engage the upper side of said rail, a jaw positioned upon said arm adapted to engage the under side of said rail, an edge each of said hook end and jaw being adapted to impinge upon the rail at any point thereupon when the device is tilted in either direction longitudinally of the rail whereby it becomes locked thereupon, and a hook-like member secured to the free end of said arm for engaging the said movable hanger adapted upon tension to tilt the device, substantially as described.

5. In combination with a single continuous supporting rail and hanger movable thereupon, a device of the class described, comprising an arm having one end thereof bent in the form of a hook to engage the upper side of said rail, a jaw adjustably positioned upon said arm adapted to engage the under side of said rail, an edge each of said hook end and jaw being adapted to impinge upon the rail at any point thereupon when the device is tilted in either direction longitudinally of the rail whereby it becomes locked thereupon, teeth formed upon one side of said jaw, and teeth adapted to register therewith formed upon the side of said arm in engagement therewith to prevent rotary movement of said jaw with respect to said arm, and means connecting the free end of said arm with the said movable hanger adapted upon tension to tilt the device, substantially as described.

CHARLES A. RICHARDS.

Witnesses:
FRED C. DAVIS,
M. E. DAVIS.

Copies of this patent may be obtained for five cents each, by addressing the "Commissioner of Patents, Washington, D. C."